United States Patent Office 3,301,059
Patented Jan. 31, 1967

3,301,059
APPARATUS FOR DETERMINING ENTHALPY OF HIGH TEMPERATURE GAS
Frederick C. Haas, Summit, N.J., assignor to Cornell Aeronautical Laboratory, Inc., Buffalo, N.Y., a corporation of New York
Filed Feb. 25, 1964, Ser. No. 347,158
6 Claims. (Cl. 73—339)

This invention relates to apparatus for determining the enthalpy of a high temperature gas.

It is common to measure the temperature of a gas by a thermocouple. However, if the temperature of the gas in which the thermocouple is arranged is so hot it may disintegrate the thermocouple and render it inoperative.

Accordingly, it is the primary object of the present invention to provide apparatus for determining factors enabling computation of the enthalpy of a gas which may be too hot to have its temperature sensed directly.

Another object is to provide as part of the inventive apparatus a probe which may be inserted into the hot gas and which will not disintegrate.

Another object is to provide such a probe which is small in size.

Other objects and advantages of the invention will be apparent from the following detailed description of a preferred embodiment illustrated in the accompanying drawings in which.

In a general way, practice of the present invention involves modifying in a known manner a process gas whose enthalpy is to be determined and which may be too hot to have its temperature sensed directly, and measuring certain characteristics of the modified gas to enable computation of the enthalpy or temperature of the original gas. The hot gas is cooled by contact with a surrounding film of transpiration coolant. Either a suitable liquid or gas may be used as the transpiration coolant.

Figure 1:
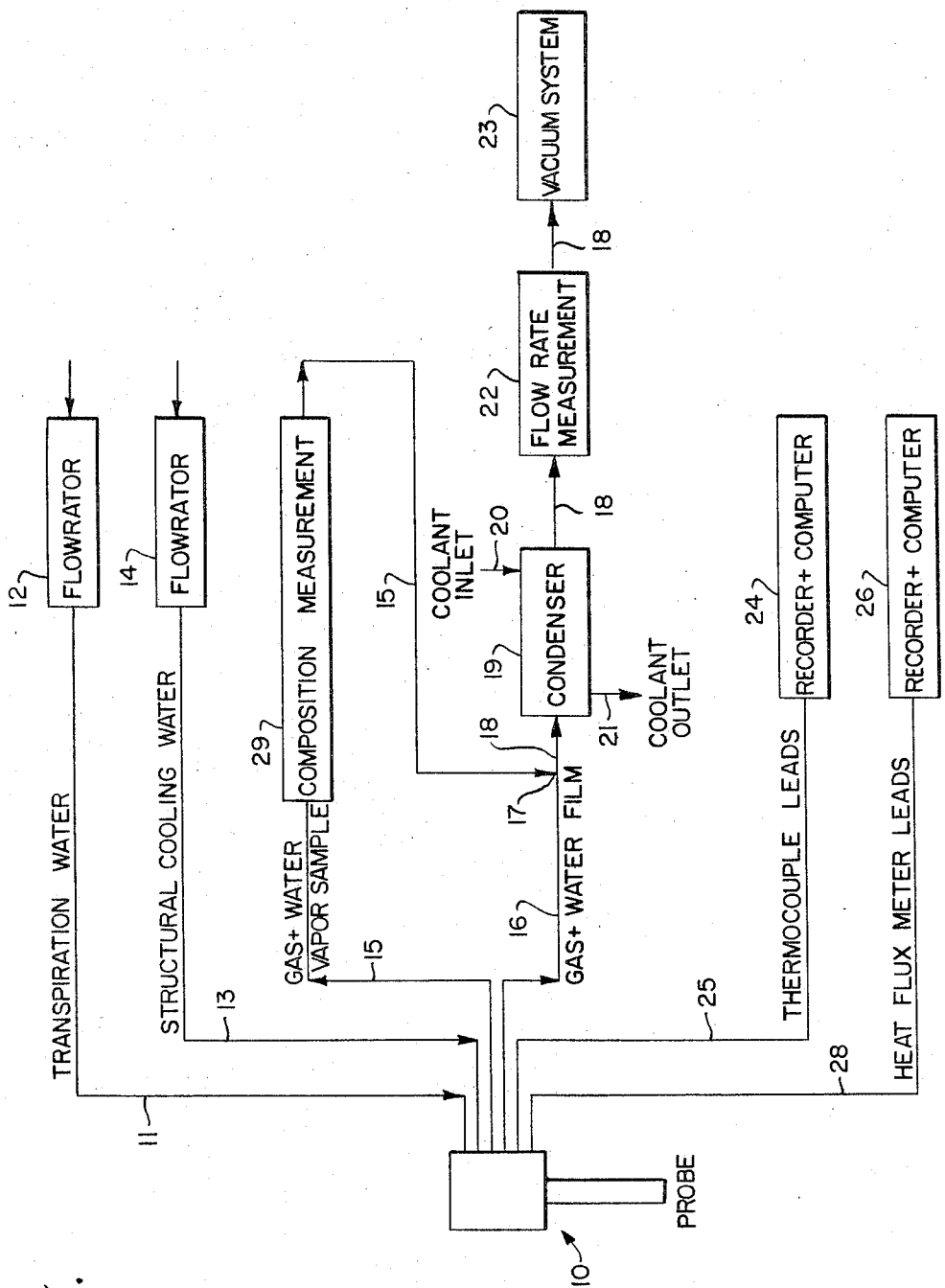
FIG. 1 is a schematic block diagram of apparatus constructed in accordance with the principles of the present invention.
Figure 2:
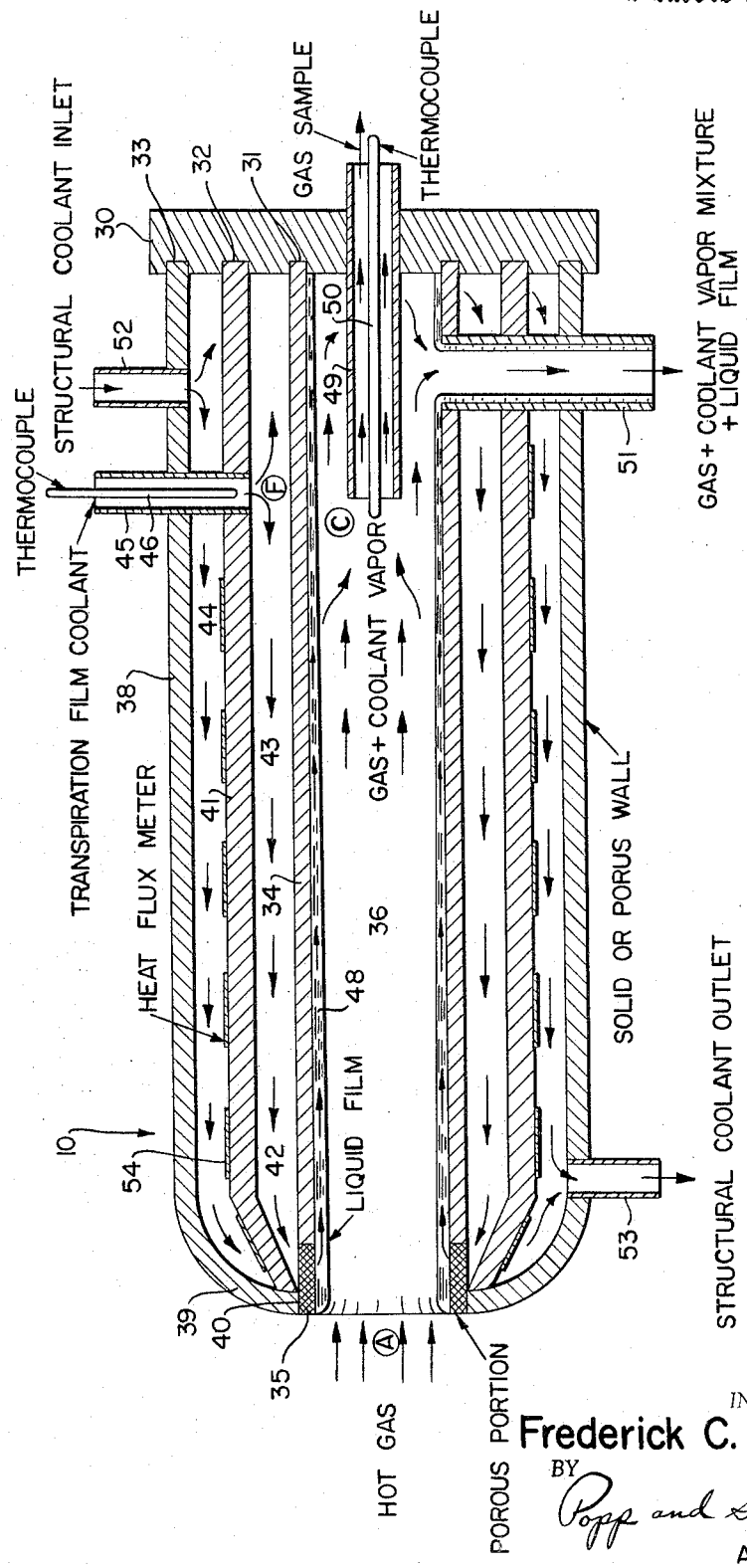
FIG. 2 is an enlarged central longitudinal sectional view of a probe embodying part of the inventive concept.

Referring to FIG. 1, the numeral 10 represents generally a probe, shown in detail in FIG. 2, which is inserted in the hot gas whose enthalpy or temperature is to be determined. Such probe 10 is associated operatively with external auxiliary equipment which will now be described.

In the embodiment illustrated, the transpiration coolant is water. The transpiration water is conducted to probe 10 through a conduit 11 in which is arranged a suitable device 12 for measuring the rate of flow and designated a flowrator.

Structural cooling water for a purpose described later herein is also conducted to probe 10, the same being conducted through a conduit 13 in which is arranged a suitable device 14 for measuring the rate of flow and designated a flowrator.

As will be apparent later herein, the probe 10 has two outlets for fluid, one being associated with a sampling outlet conduit 15 and the other being associated with a main outlet conduit 16. Conduit 15 reconnects with conduit 16 at a downstream location indicated at 17, thereafter to become conduit 18.

Arranged in conduit 15 is a suitable device designated 29 for measuring the composition of the fluid sample being supplied thereto by the upstream portion of conduit 15, such measurement determining the mass fraction of water as the transpiration coolant in the mixture of process gas and water vapor. Conduit 16 conveys a mixture of process gas and water in liquid and vaporous form.

The merged stream produced by the juncture of conduits 15 and 16 is carried downstream from location 17 through conduit 18 to a suitable condenser 19. A suitable coolant such as water is admitted to condenser 19 through an inlet conduit 20 and discharged through an outlet conduit 21.

In conduit 18 downstream of condenser 19 there is arranged a suitable device 22 for measuring the flow rate of fluid passing through this conduit. Downstream of device 22 there is arranged in conduit 18 a suitable device 23 for creating a vacuum in this and all communicating conduits, such device 23 being designated a vacuum system. Its purpose is to induce a flow of fluid through the various connected conduits 15–17.

Still referring to FIG. 1, there is also shown a suitable mechanism indicated at 24 and designated recorder and computer which is operatively associated with thermocouples arranged in probe 10 and later to be described, such association being through suitable leads represented by a line 25.

Another suitable mechanism 26 designated a recorder and computer is operatively associated with heat flux meter means also arranged within probe 10 and later to be described, such association being through leads represented by a line 28.

Probe 10 will now be described in detail and for this purpose reference is made to FIG. 2. Probe 10 is shown as comprising an end plate 30 having three concentric circular grooves 31, 32 and 33 arranged in one side thereof. Sealingly arranged in the innermost groove 31 is one end of an elongated cylindrical tube or conduit 34. The opposite end of this tube 34 includes a porous portion 35 through which transpiration coolant is admitted into the interior of tube 34, such interior forming a passage designated 36.

Surrounding tube 34 in radially spaced relation thereto is an outer cylindrical jacket wall member 38. One end of this member 38 is sealingly received in outer groove 33. The other end of member 38 is inturned to provide an integral end wall designated 39. This end wall 39 has a suitable cylindrical opening therein indicated at 40 through which the porous portion 35 of tube 34 extends. End wall 39 and porous portion 35 of tube 34 are suitably connected together. Outer jacket wall member 38 may be either solid or porous.

An inner cylindrical jacket wall member 41 is arranged intermediate tube 34 and outer jacket wall member 38 in radially spaced relation to each other. One end of inner jacket wall member 41 is sealingly received in intermediate groove 32. The other end of this member 41 is shown as having an integral converging frusto-conical end section designated 42, the outer narrow end of which is suitably joined to end wall 39 immediately surrounding porous portion 35 of tube 34.

In this manner, an inner jacket chamber 43 is provided between tube 34 and inner jacket wall member 41, and an outer jacket chamber 44 is provided between the inner and outer jacket wall members 41 and 38, respectively.

Means are provided for admitting transpiration coolant such as water to jacket chamber 43. Such means is shown as comprising an inlet tube 45 which extends sealingly through registered holes provided in wall members 38, 41, the inner end of this tube 45 being in fluid conducting communication with chamber 43. The outer end of inlet tube 45 is suitably connected to conduit 11 shown in FIG. 1.

A thermocouple 46 is shown as disposed in inlet conduit 45 with its hot junction arranged adjacent the inner end of such tube, such location being designated F. The thermocouple measures at F the temperature of transpiration coolant entering through conduit 45. The leads of this thermocouple 46 are represented by line 25 shown in FIG. 1.

Transpiration coolant leaves chamber 43 through the pores or interstices of porous portion 35 of tube 34 to flood this tube annularly at its open end which is the entrance for hot process gas. Such entrance is designated A. The flow of the incoming stream of hot gas carries laterally entering transpiration coolant axially downstream so as to coat the entire internal annular surface of tube 34 and thereby form a film 48 on such surface which surrounds and contacts directly the hot gas stream. If the transpiration coolant is a liquid such as water, contact with the hot gas will cause some of the coolant to vaporize and this cool vapor mixes with the gas. The effect, of course, is to cool the process gas.

Means are provided for withdrawing and bypassing a portion of the fluid stream generated within tube 34 as a result of the transaction between the incoming process gas and coolant. Such means are shown as comprising a sampling outlet tube 49 sealingly arranged in and extending through a hole arranged in end wall 30. Tube 49 is arranged co-axially with main tube 34. The location of the inner end of sampling outlet tube 49 is spaced axially inwardly of end wall 30 and is designated C. The outer end of this tube 49 is suitably connected to conduit 15 shown in FIG. 1.

A thermocouple 50 is shown disposed in sampling outlet tube 49 and has its hot junction arranged at about the inner end thereof or at location C. The leads of this thermocouple 50 are also represented by line 25 shown in FIG. 1.

While some of the mixture of hot process gas and coolant, the latter being partly in the form of vapor in the case of the coolant being initially a liquid, is withdrawn through sampling outlet tube 49, the balance of the mixture is withdrawn from passage 36 by suitable means. Such means are shown as comprising a main outlet tube 51 which is sealingly arranged in registered holes provided in tube 34 and jacket wall members 41, 38. The interior of this outlet tube 51 at its inner end is in fluid conducting communication with passage 36. The outer end of this outlet tube 51 is suitably connected to conduit 16 shown in FIG. 1.

A structural coolant, which may be water for example, is preferably circulated through outer jacket chamber 44. For this purpose, an inlet tube 52 is sealingly arranged in a hole provided in outer jacket wall member 38 adjacent end wall 30. The interior of this inlet tube 52 is in fluid conducting communication with chamber 44. The outer end of this inlet tube 52 is suitably connected to conduit 13 shown in FIG. 1. A structural coolant outlet tube 53 is shown as being sealingly arranged in a hole provided in outer jacket wall member 38 adjacent end wall 39 thereof. The outer end of this outlet tube 53 may dump the structural coolant in any suitable place or, if desired, the structural coolant may be recycled.

Suitable means are provided for measuring the energy loss or gain across inner jacket wall member 41. While such means may be variously constructed, the same are shown as comprising heat flux meter means 54 arranged in outer jacket chamber 44 and mounted on the external surface of inner jacket wall member 41. These heat flux meter means may be of any suitable construction and the leads thereof are represented by the line 28 shown in FIG. 1.

OPERATION

It is assumed that a structural coolant such as water is circulated through outer jacket chamber 44 at a known rate measured by flowrator 14. If outer jacket wall member 38 is solid, forced convection cooling is provided; but if the member is porous, evaporative film cooling is provided. Either way the external surfaces of probe 10 are protected from deterioration in the high temperature environment.

A transpiration coolant such as water is circulated through inner jacket chamber 43 at a known rate determined by flowrator 12 and at a known temperature determined by thermocouple 46 at location F. Assuming the transpiration coolant circulated is water, such water leaves chamber 43 through porous tube portion 35 and annularly floods the internal surface of tube 34. The incoming hot process gas entering tube 34 at A carries this transpiration water downstream so as to coat the internal surface thereof with liquid film 48. Contact with the hot process gas causes some of the liquid in film 48 to vaporize and mix with the process gas. A portion of the gas and coolant vapor mixture is continuously withdrawn through sampling outlet tube 49. The temperature of such mixture at location C is measured by thermocouple 50. The balance of process gas and coolant, vaporized and unvaporized, is withdrawn through main outlet tube 51. Downstream device 22 measures the flow rate of the process gas flowing through outlet tubes 49 and 51. Such flow is induced by the suction device 23.

The film 48 of liquid coolant of high latent heat is used to cool the process gas stream by evaporation of some of the liquid into the gas stream. The sample of the gas-vapor mixture withdrawn through sampling outlet tube 49 is analyzed in device 29 for composition to determine the proportion of coolant in the mixture.

The heat flux meter 54 measures energy loss or gain across the outer surface of inner jacket wall member 41.

Enthalpy of the entering process gas at A is computed by an energy balance technique which may be represented as follows:

Entrance gas enthalpy=exit gas enthalpy+enthalpy loss to vaporized coolant+enthalpy loss to nonvaporized coolant±enthalpy loss or gain due to energy sinks or sources;

and by the following operating equation:

$$Hg_A = Hg_C + \frac{Yc_C}{1-Yc_C}[Hc_C - Hc_F]$$

$$+ \left[\frac{Wc_F}{Wg_A} - \frac{Yc_C}{1-Yc_C}\right][Hc_{\text{liq.Tv}} - Hc_F] \pm \frac{1}{Wg_A}\int_0^L \frac{q(x)}{H}dx$$

wherein:

$Hg_A$=enthalpy of hot gas entering probe (B.t.u./#gas).
$Hg_C$=enthalpy of gas at point C (B.t.u./#gas).
$Yc_C$=mass fraction of coolant in gas stream at point C (#coolant/#gas mixture).
$Hc_C$=enthalpy of coolant vapor at point C (B.t.u./#coolant).
$Hc_F$=enthalpy of coolant at point F (B.t.u./#coolant).
$Wc_F$=mass flow rate of coolant entering at F (#/hr.).
$Wg_A$=mass flow rate of gas entering at A (#/hr.).
$Hc_{\text{liq.Tv}}$=enthalpy of unvaporized liquid at point C (B.t.u./#coolant).
$L$=length between points A and C.
$x$=the distance along channel 36 measured from point A; that is, at point A distance $x$ equals zero and at point C distance $x$ equals L.
$q_H$=heat flux measured by heat meter (B.t.u./ft. hr.).
=pound.
B.t.u.=British thermal unit.
ft.=foot.
hr.=hour.
sec.=second.

While water has been given as a specific example of a transpiration coolant, a low temperature gas of a high heat capacity such as hydrogen or helium may be used in place of an evaporating liquid. Use of water in an actual probe having an outside diameter of only about 0.1 inch enabled the probe to be used in an environment of high heat flux such as $q/A = 1{,}500$ B.t.u./ft.$^2$ sec.

Determining the factors by apparatus such as described hereinabove enables the enthalpy of the hot gas to be computed at location A, according to the above equation. If the temperature of the gas stream is desired, this may be evaluated from a Mollier diagram using the measured enthalpy in conjunction with a pressure measurement.

From the foregoing, it will be seen that the present invention accomplishes the objects stated. Modifications in construction of the apparatus may occur to those skilled in the art without departing from the spirit of the invention. Accordingly, the apparatus illustrated and described is intended to be illustrative and not limitative of the present invention, the scope of which is to be measured by the appended claims.

What is claimed is:

1. Apparatus for determining factors enabling computation of the enthalpy of a gas which may be too hot to have its temperature sensed directly, comprising a main conduit, a bypass conduit having one end connected to said main conduit at an upstream location and having its other end connected to said main conduit at a downstream location, said main conduit being of substantially uniform cross-section upstream from such bypass one end connection, said gas flowing through said conduits, means for annularly flooding at a known flow rate the internal surface of said main conduit at the entrance thereto with a transpiration coolant of known temperature which is carried downstream by the gas flowing through said main conduit so as to form on the internal surface of said main conduit a film which envelops the gas stream, means for determining the fraction of coolant to gas in the portion of said stream flowing through said bypass conduit, means for measuring the temperature of said stream at said upstream location, and means for measuring the flow rate of said stream.

2. Apparatus for determining factors enabling computation of the enthalpy of a gas which may be too hot to have its temperature sensed directly, comprising a main conduit, a bypass conduit having one end connected to said main conduit at an upstream location and having its other end connected to said main conduit at a downstream location, said main conduit being of substantially uniform cross-section upstream from such bypass one end connection, means arranged downstream of said downstream location for measuring the flow rate of said stream, means arranged downstream of the last means for inducing said gas to flow through said conduits, means for annularly flooding at a known flow rate the internal surface of said main conduit at the entrance thereto with a transpiration coolant of known temperature which is carried downstream by the gas flowing through said main conduit so as to form on the internal surface of said main conduit a film which envelops the gas stream, means for determining the fraction of coolant to gas in the portion of said stream flowing through said bypass conduit, and means for measuring the temperature of said stream at said upstream location.

3. In apparatus for determining factors enabling computation of the enthalpy of a gas which may be too hot to have its temperature sensed directly, a probe comprising means providing a first passage having a gas inlet and outlet, means providing a second passage surrounding at least in part said first passage and having an inlet and outlet for a transpiration coolant, said transpiration coolant outlet communicating with said first passage adjacent said gas inlet, means providing a third passage surrounding at least in part said second passage and having an inlet and outlet for a structural coolant, means providing a fourth passage for withdrawing a fluid sample from said first passage, means for sensing the temperature of the fluid in said first passage at the entrance to said fourth passage, means for sensing the temperature of the transpiration coolant in said inlet therefor, and heat flux meter means in said third passage for measuring the heat flow between said third and second passages.

4. In apparatus for determining factors enabling computation of the enthalpy of a gas which may be too hot to have its temperature sensed directly, a probe comprising means providing a first passage having a gas inlet and an outlet remote therefrom, means providing a second passage surrounding at least in part said first passage and having an inlet and outlet for a transpiration coolant, said transpiration coolant outlet communicating with said first passage adjacent said gas inlet, said transpiration coolant inlet being remote from said transpiration coolant outlet, means providing a third passage surrounding at least in part said second passage and having an inlet and outlet for a structural coolant, said structural coolant outlet being adjacent said transpiration coolant outlet, said structural coolant inlet being remote from said structural coolant outlet, means providing a fourth passage for withdrawing a fluid sample from said first passage, means for sensing the temperature of the fluid in said first passage at the entrance to said fourth passage, means for sensing the temperature of the transpiration coolant in said inlet therefor, and heat flux meter means in said third passage for measuring the heat flow between said third and second passages.

5. In apparatus for determining factors enabling computation of the enthalpy of a gas which may be too hot to have its temperature sensed directly, a probe comprising a main conduit having an open end through which gas may enter, an inner annular jacket wall surrounding said main conduit and spaced therefrom to provide an inner chamber, an outer annular jacket wall surrounding said inner wall and spaced therefrom to provide an outer chamber, said main conduit having a porous annular portion adjacent its said open end, means for flowing transpiration coolant from an inlet through said inner chamber for discharge through said porous portion into the interior of said conduit, means for flowing a structural coolant through said outer chamber, heat flux meter means surrounding said inner wall, a sampling outlet conduit projecting into said main conduit at the downstream end thereof and arranged coaxially thereof, a main outlet conduit extending laterally from said main conduit adjacent its said downstream end, a first thermocouple at the entrance to said sampling outlet conduit, and a second thermocouple in said inlet.

6. In apparatus for determining factors enabling computation of the enthalpy of a gas which may be too hot to have its temperature sensed directly, a probe comprising a conduit having an open end through which said gas flows and including an annular porous wall portion adjacent said open end, inlet means for flowing a transpiration coolant through said porous wall portion, the coolant so introduced being carried downstream by the gas flowing through said conduit so as to form on the internal surface of said conduit a film which envelops the gas stream, means for measuring the temperature of said coolant at said inlet means, a bypass conduit communicating with said conduit, means for measuring the temperature of the fluid in said bypass conduit, and means for determining the fraction of coolant to gas in the fluid in said bypass conduit.

References Cited by the Examiner

UNITED STATES PATENTS

| | | | |
|---|---|---|---|
| 2,691,890 | 10/1954 | Moore et al. | 73—421.5 |
| 2,995,933 | 8/1961 | Patton | 73—213 |
| 3,006,194 | 10/1961 | Green et al. | 73—421.5 |
| 3,167,956 | 2/1965 | Grey | 73—190 |

OTHER REFERENCES

Tine: Gas Sampling and Chemical Analysis in Combustion Processes, Pergamon Press, New York, N.Y., 1961, pp. 27–33 and 48–49.

LOUIS R. PRINCE, *Primary Examiner.*

S. CLEMENT SWISHER, *Assistant Examiner.*